Aug. 31, 1937.                    J. T. CATLETT                    2,091,308
                                WELDING APPARATUS
                            Original Filed Oct. 19, 1935

Inventor:
James T. Catlett,
by Harry E. Dunham
His Attorney.

Patented Aug. 31, 1937

2,091,308

UNITED STATES PATENT OFFICE 2,091,308

WELDING APPARATUS

James T. Catlett, Scotia, N. Y., assignor to General Electric Company, a corporation of New York Application October 19, 1935, Serial No. 45,753
Renewed July 14, 1937

8 Claims. (Cl. 113—59)

My invention relates to welding apparatus.

In the welding of substantially closed vessels to which a combustible gas is supplied against the inside of the vessel opposite the welding agency, it has been found that explosions occur during the welding operation.

It is an object of my invention to provide means for eliminating these explosions.

More specifically, it is an object of my invention to supply a combustion supporting gas to a substantially closed vessel to which a combustible gas is supplied against the inside of the vessel opposite the welding agency.

It is a further object of my invention to provide an improved means for supporting a welding agency which provides for vertical and transverse adjustments thereof relative to the work being welded.

It is also an object of my invention to provide in such a support means for moving the welding head a substantial distance from the work to facilitate the loading and unloading of work positioned during welding in a machine of which the support forms a cooperating part.

Figure 1:
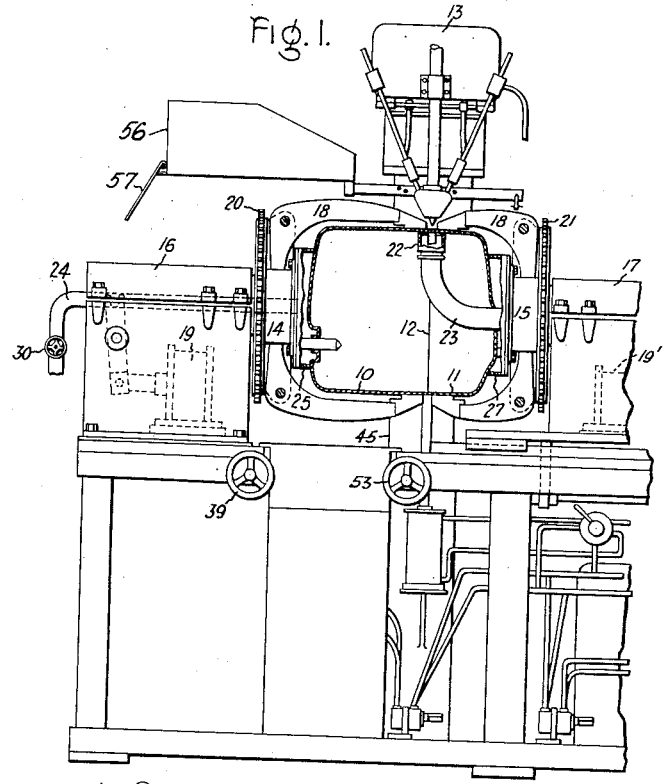
Figure 2:
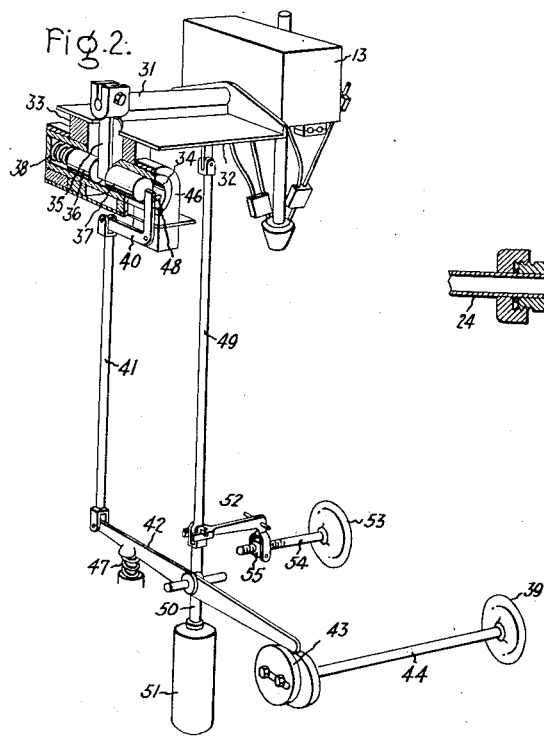

Further objects of my invention will become apparent from a consideration of the following description taken in connection with the accompanying drawing Fig. 1 of which shows a portion of a machine embodying my invention; Fig. 2 of which illustrates the construction of the support for the welding agency; and Fig. 3 of which illustrates one manner in which a combustion supporting gas may be supplied to a substantially closed vessel which is welded while a combustible gas is supplied to the inside of the vessel opposite the welding agency.

My invention is incorporated in the welding machine forming the subject matter of application Serial No. 45,752, James T. Catlett and Verni J. Chapman, filed concurrently herewith for Welding machine and assigned to the assignee of the present invention. The novel features of the machine, aside from the features particularly claimed herein, have been specifically claimed in that application.

In the machine illustrated in Fig. 1 of the drawing the complementary parts 10 and 11 of a beer barrel liner are supported in work holders with the seam 12 between the parts positioned beneath the welding agency 13. The work holders illustrated are chucks 14 and 15 supported for rotation in bearings in the head stock 16 and the tail stock 17 of the machine. It is to be noted that the clamping arms 18 of the chucks engage the parts 10 and 11 at points closely adjacent to seam 12. These chucks are opened and closed by fluid operated mechanisms 19 and 19' respectively enclosed within the head stock 16 and tail stock 17. Both chucks are positively rotated by gearing, parts of which 20 and 21 are apparent in the drawing. The arrangement is such that the chucks are held in definite predetermined positions relative to one another.

During welding the seam 12 is backed by a member 22 which is supported on the curved end portion of the shaft 23 which extends through the tail stock 17, chuck 15, and an opening in the end of the part 11 of the vessel.

The welding agency illustrated in the drawing is of the type described in my United States Letters Patent No. 1,946,305 granted February 6, 1934, for Welding apparatus, and assigned to the assignee of the present invention. This type of welding agency is commonly known as an atomic hydrogen torch or head which renders available the heating effects of flames of atomic hydrogen. In such torches the arcing terminals of a plurality of electrodes are placed adjacent the work and a jet of hydrogen is supplied across the arcing terminals of these electrodes and directed against the work. In the arc the hydrogen is disassociated to its atomic state and recombines at the work forming a high temperature flame, which is used for welding.

It has been found that the under-surface of a weld is greatly improved if a shielding gas is supplied thereto and in the machine illustrated means are provided for supplying hydrogen about the backing member 22 and the portions of the work adjacent thereto. This improves the surface appearance of the underside of the weld and prevents scaling of the work parts at the weld.

Figure 3:
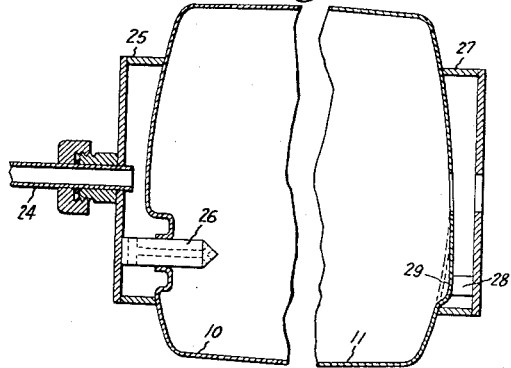

It has been found, however, that the presence of a combustible gas within a substantially closed vessel during the welding operation frequently results in explosions which interfere with the welding operation and at times proves dangerous to the operator. I have found that if a combustion supporting gas is supplied to the vessel, these explosions can be successfully eliminated. One manner of supplying the combustion supporting gas is illustrated in Figs. 1 and 3. The means there illustrated comprises a conduit 24 which extends through the axis of rotation of chuck 14 and terminates in an indexing device 25 engaging the end portion of part 10 of the vessel. The indexing device 25 forms parts of chuck 14 and is provided with a pin 26 having an opening therethrough communicating with the chamber formed by the indexing device and the end wall of part 10 of the vessel. The pin 26 enters an opening in the part 10 and thus holds it in a predetermined position relative to the indexing device 25 of which it forms a part. The other part 11 of the vessel is supported in an indexing device 27 which forms part of chuck 15 and is provided with a part 28, which fits over a bulging part 29 of part 11 and serves to hold it in a predetermined position relative thereto. Since the indexing devices 25 and 27 have predetermined positions in the chucks 14 and 15 which are positively geared together, the works parts 10 and 11 will be accurately positioned with respect to one another in the positions they are to assume in the finished article after it has been welded. It will, of course, be apparent that the nature of the indexing devices will depend upon the articles being welded and will be modified to satisfy the conditions presented by various work parts. The combustion supporting gas supplied to the vessel may be air under pressure and the amount thereof may be controlled by a valve 30 (Fig. 1) located in the conduit 24.

The support for the welding head 13 is illustrated in Fig. 2. It is mounted on the projecting end portion of a shaft 31 supported for rotation on one arm 32 of a bracket, the other arm 33 of which is supported for rotation on a hollow shaft 34. An arm 35 attached to the shaft 31 extends through an opening in the hollow shaft 34 and is located between cylindrical blocks 36 and 37 positioned in the hollow shaft 34. One block 36 is biased into engagement with the arm 35 by a spring 38, which acting through block 36 on the arm 35, tends to rotate the shaft 31 in one direction. The rotational adjustment of the welding head 13 and the shaft 31 is controlled by the position of block 37 in the hollow shaft 34. This block may be moved to adjusted positions within the shaft 34 through the agency of a linkage terminating in a hand wheel 39 at the front of the machine. This linkage comprises a bell crank lever 40, a rod 41, a lever 42, a cam mechanism 43 and a shaft 44. The levers 40 and 42 are pivotally supported in the frame of the machine or on the column 45 on the top end of which the bearings 46 for the hollow shaft 34 are supported. The lever 42 is held in engagement with the cam mechanism 43 by a spring 47 acting against one end of this lever. The cam mechanism comprises two circular members which are adjustable relatively to one another to secure an offset giving the desired range of adjustment for moving the welding head 13 across the seam 12 between the complementary parts 10 and 11 of the vessels supported in the machine. It will be noted that the spring 38 acting on block 36 is enclosed within the hollow shaft 34 and that a stop 48, also within the hollow shaft 34, is provided for limiting the movement of the blocks and lever 40 in the shaft under the action of spring 38.

The welding head may be moved from its operating position illustrated in Fig. 1 to an inoperative position in which it is removed a substantial distance from the work by tilting the bracket 32—33 about the axis of the hollow shaft 34. The mechanism employed for this purpose comprises a rod 49, one end of which is connected to a piston rod 50 which is moved in and out of a cylinder 51. This cylinder forms part of the fluid operating mechanism of the machine, the specific nature of which forms no part of the present invention. The operating position of the welding head is determined by an adjustable stop. This stop comprises a bell crank lever 52 which is pivotally supported in the machine and has one end upon which an enlarged portion of the connection to the bracket 32—33 rests when the operating fluid has been exhausted from the lower portion of the cylinder 51. The position of the bell crank lever 52 is determined by a hand wheel 53 which is connected to one end of shaft 54, the other end of which is threaded for a nut 55 supported in the other arm of the bell crank lever 52. From the construction described, it is apparent that the vertical adjustment of the welding head over the seam between the work parts is determined by the adjustment of the hand wheel 53.

The operation of the parts of the machine above described are believed to be perfectly apparent from the description given above. The construction of the machine is such that the complementary parts 10 and 11 are supported in the chucks 14 and 15 with the weld backing member 22 beneath the seam during welding. The position of the welding agency is determined by the adjustment of hand wheels 39 and 53 as above noted. Explosions are prevented during welding by supplying combustion supporting gas to the vessel through the mechanism particularly described above.

The operator may be protected from the heat of the welding agency by a shield 56 which may be swung about the agency from its position illustrated in Fig. 1. This shield is provided with a screen 57 through which the operator may view the welding operation during welding.

Various modifications of the arrangements above described may be made without departing from my invention. It is, of course, apparent that the welding agency may be a gas torch or an arcing electrode instead of the gas-arc torch above described. It is also apparent that various means may be employed for supplying a shielding gas to the vessel inside of the vessel opposite the welding agency, and that various means may also be provided for supplying another gas to the vessel which will prevent explosions taking place during welding. Such modifications will be apparent to those skilled in the art in view of the particular embodiment above illustrated and described, and I intend consequently to cover in the appended claims all such modifications as fall within the spirit and scope of my invention.

What I claim as new and desire to secure by Letters Patent of the United States is:

1. Apparatus for fabricating substantially closed vessels comprising means for supporting the complementary parts of a vessel in assembled relationship, a welding agency, means for positioning said welding agency opposite the outside surface of said vessel at the seam between said parts, means for traversing said vessel and said welding agency relatively to one another along the seam between said parts, means for supplying a combustible gas against the inside surface of said vessel opposite said welding agency, and means for supplying a combustion supporting gas to the inside of said vessel.

2. Apparatus for fabricating substantially closed vessels comprising means for supporting the complementary parts of a vessel in assembled relationship, a welding agency, means for positioning said welding agency over the outside surface of said vessel at the seam between said parts, means for traversing said vessel and said welding agency relatively to one another along the seam between said parts, a weld backing member, means for positioning said backing member opposite said welding agency against the inside surface of said vessel at the seam between said parts, means for supplying a combustible gas about said backing member and the parts of said vessel adjacent thereto with which said backing member makes engagement during welding, and means for supplying a combustion supporting gas to the inside of said vessel.

3. Apparatus for fabricating substantially closed vessels comprising means including chucks for supporting the complementary parts of a vessel for rotation about a common axis, means for imparting rotation to at least one of said chucks, a welding agency, means for positioning said welding agency opposite the outside surface of said vessel at the seam between said parts, a weld backing member, means for positioning said backing member against the inside surface of said vessel at the seam between said parts, means for supplying a combustible gas about said backing member and the parts of the vessel adjacent thereto with which it makes contact during welding, and means extending through the axis of rotation of one of said chucks for supplying a combustion supporting gas to said vessel.

4. Apparatus for fabricating substantially closed vessels comprising means including chucks for supporting the complementary parts of a vessel for rotation about a common axis, a welding agency, means for supporting said welding agency opposite the outside surface of said vessel at the seam between said parts, means for tilting said welding agency relatively to said supporting means and for adjusting said welding agency across the seam between said parts of said vessel, means for tilting said supporting means and said welding agency to and from a welding position in which said welding agency is adjacent said vessel to a position in which said welding agency is moved a substantial distance from said vessel, means for rotating said chucks and traversing said vessel and said welding agency relatively to one another along the seam between said parts of said vessel, means extending through the axis of rotation of said chucks for supplying a combustible gas against the inside surface of said vessel opposite said welding agency, and means extending through the axis of rotation of said chucks for supplying a combustion supporting gas to the inside of said vessel.

5. Welding apparatus comprising a bracket, a shaft about which one arm of said bracket is rotatably supported, a second shaft supported on the other arm of said bracket for rotation about a longitudinal axis spaced from and angularly disposed to the longitudinal axis of said first mentioned shaft, a welding agency mounted on said second shaft and positioned opposite the outer end of said other arm of said bracket, and means movable along said first mentioned shaft and engaging said second shaft for rotating said second shaft and said welding agency about the longitudinal axis of said second shaft.

6. Welding apparatus comprising a bracket, a hollow shaft about which one arm of said bracket is rotatably supported, means supported on the other arm of said bracket for rotation about a longitudinal axis spaced from and angularly disposed to the longitudinal axis of said hollow shaft and having a projecting portion extending into the opening in said hollow shaft, a welding agency mounted on said last mentioned means and positioned opposite the outer end of said other arm of said bracket, means extending through the opening in said hollow shaft and acting on said projecting portion for rotating said welding agency about the longitudinal axis of said supporting means, and means for rotating said welding agency about the longitudinal axis of said hollow shaft.

7. Welding apparatus comprising a bracket, a shaft extending along and projecting from one arm of said bracket, a welding agency supported on the projecting end of said shaft, a hollow shaft about which the other arm of said bracket is rotatably supported, said hollow shaft being spaced from and extending at right angles to said first mentioned shaft and having an opening in its side wall opposite said first mentioned shaft, an arm mounted on said first mentioned shaft and projecting through said opening in the side wall of said hollow shaft, means extending axially into said hollow shaft and acting on said arm for rotating said first mentioned shaft, means connected to said bracket for tilting said welding agency about said hollow shaft from a welding position adjacent the work to a postion in which the welding agency is removed a substantial distance from the work, and means including an adjustable stop acting on said last mentioned means for adjusting the position of said bracket when said welding agency is in an operating position relative to the work.

8. Welding apparatus comprising a bracket, a shaft, extending along and projecting from one arm of said bracket, a welding agency supported on the projecting end of said shaft, a hollow shaft about which the other arm of said bracket is rotatably supported, said hollow shaft being spaced from and extending at right angles to said first mentioned shaft and having an opening in its side wall opposite said first mentioned shaft, an arm mounted on said first mentioned shaft and projecting through said opening in the side wall of said hollow shaft, blocks in said hollow shaft positioned on opposite sides of said arm, means for biasing a block on one side of said arm, against said arm, and means extending into the end of said hollow shaft and acting on a block on the other side of said arm for moving said arm against the bias imparted thereto by said biased block.

JAMES T. CATLETT.